US012204290B2

(12) United States Patent
Tanabe

(10) Patent No.: US 12,204,290 B2
(45) Date of Patent: Jan. 21, 2025

(54) ELECTRONIC WATCH AND CONTROL METHOD FOR ELECTRONIC WATCH

(71) Applicant: Seiko Epson Corporation, Tokyo (JP)

(72) Inventor: Takuya Tanabe, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 406 days.

(21) Appl. No.: 17/592,539

(22) Filed: Feb. 4, 2022

(65) Prior Publication Data

US 2022/0253018 A1 Aug. 11, 2022

(30) Foreign Application Priority Data

Feb. 5, 2021 (JP) ................................ 2021-017293

(51) Int. Cl.
*G04G 21/04* (2013.01)

(52) U.S. Cl.
CPC .................................. *G04G 21/04* (2013.01)

(58) Field of Classification Search
CPC ......... G04G 21/04; G04R 20/04; G04R 20/02
USPC ........................................................ 368/10
See application file for complete search history.

(56) References Cited

U.S. PATENT DOCUMENTS

| | | | | |
|---|---|---|---|---|
| 2013/0051188 | A1 * | 2/2013 | Akiyama | G04R 20/04 368/47 |
| 2017/0277140 | A1 * | 9/2017 | Akiyama | G04R 20/02 |
| 2018/0173168 | A1 * | 6/2018 | Hasegawa | G04R 20/26 |

FOREIGN PATENT DOCUMENTS

| | | | | |
|---|---|---|---|---|
| JP | 2005-351674 | A | | 12/2005 |
| JP | 2007-333429 | A | | 12/2007 |
| JP | 2013092535 | A | * | 5/2013 |
| JP | 2013205363 | A | * | 10/2013 |
| JP | 2015-169493 | A | | 9/2015 |
| JP | 2015-169496 | A | | 9/2015 |
| JP | 2019164013 | A | * | 9/2019 |

* cited by examiner

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

An electronic watch includes a reception circuit configured to receive a radio wave, a hand, an operation device, a storage unit configured to store a reception result of whether reception by the reception circuit succeeds or fails, and a reception controller configured to switchably set a reception permission state where reception is permitted and a reception inhibition state where reception is inhibited, wherein when first operation of the operation device is performed, the hand indicates a first position in a case in which the reception permission state is set and a reception result stored in the storage unit is a success, indicates a second position in a case in which the reception permission state is set and a reception result stored in the storage unit is a failure, and indicates a third position in a case in which the reception inhibition state is set.

8 Claims, 5 Drawing Sheets

ELECTRONIC WATCH AND CONTROL METHOD FOR ELECTRONIC WATCH

The present application is based on, and claims priority from JP Application Serial Number 2021-017293, filed Feb. 5, 2021, the disclosure of which is hereby incorporated by reference herein in its entirety.

BACKGROUND

1. Technical Field

The present disclosure relates to an electronic watch and a control method for the electronic watch.

2. Related Art

JP-A-2015-169496 discloses that a user operates an A button and moves a hand indicating an information display to select a reception inhibited display, thereby ceasing reception of a satellite signal to an electronic watch. It also discloses that when the user manipulates a B button, the hand indicates either the "Y" or "N" designation and displays a reception result of the satellite signal.

In JP-A-2015-169496, a reception inhibition state and a reception result are displayed by the same hand by operating different buttons. Thus, when the reception result is displayed in the B button operation during the reception inhibition state, the user could misunderstand that automatic reception is being performed, for example.

SUMMARY

An electronic watch of the present disclosure includes a reception circuit configured to receive a radio wave, a hand, an operation device, a storage unit configured to store a reception result of whether reception by the reception circuit succeeds or fails, a display controller configured to control the hand, and a reception controller configured to switchably set a reception permission state where reception by the reception circuit is permitted and a reception inhibition state where reception by the reception circuit is inhibited, wherein when first operation of the operation device is performed, the display controller controls the hand to indicate a first position in a case in which the reception permission state is set and a reception result stored in the storage unit is a success, indicate a second position in a case in which the reception permission state is set and a reception result stored in the storage unit is a failure, and indicate a third position in a case in which the reception inhibition state is set.

A control method for an electronic watch of the present disclosure includes detecting that first operation of the operation device is performed, controlling, when the first operation is detected, a hand to indicate a first position in a case in which a reception permission state where reception by a reception circuit is permitted is set and a reception result stored in a storage unit is a success, indicate a second position in a case in which the reception permission state is set and a reception result stored in the storage unit is a failure, and indicate a third position in a case in which a reception inhibition state where reception by the reception circuit is inhibited is set, detecting that second operation of the operation device is performed, and switching between the reception permission state and the reception inhibition state when the second operation is detected.

DESCRIPTION OF EXEMPLARY EMBODIMENTS

Hereinafter, an electronic watch 1 according to the exemplary embodiment of the present disclosure will be described with reference to the drawings.

Figure 1:
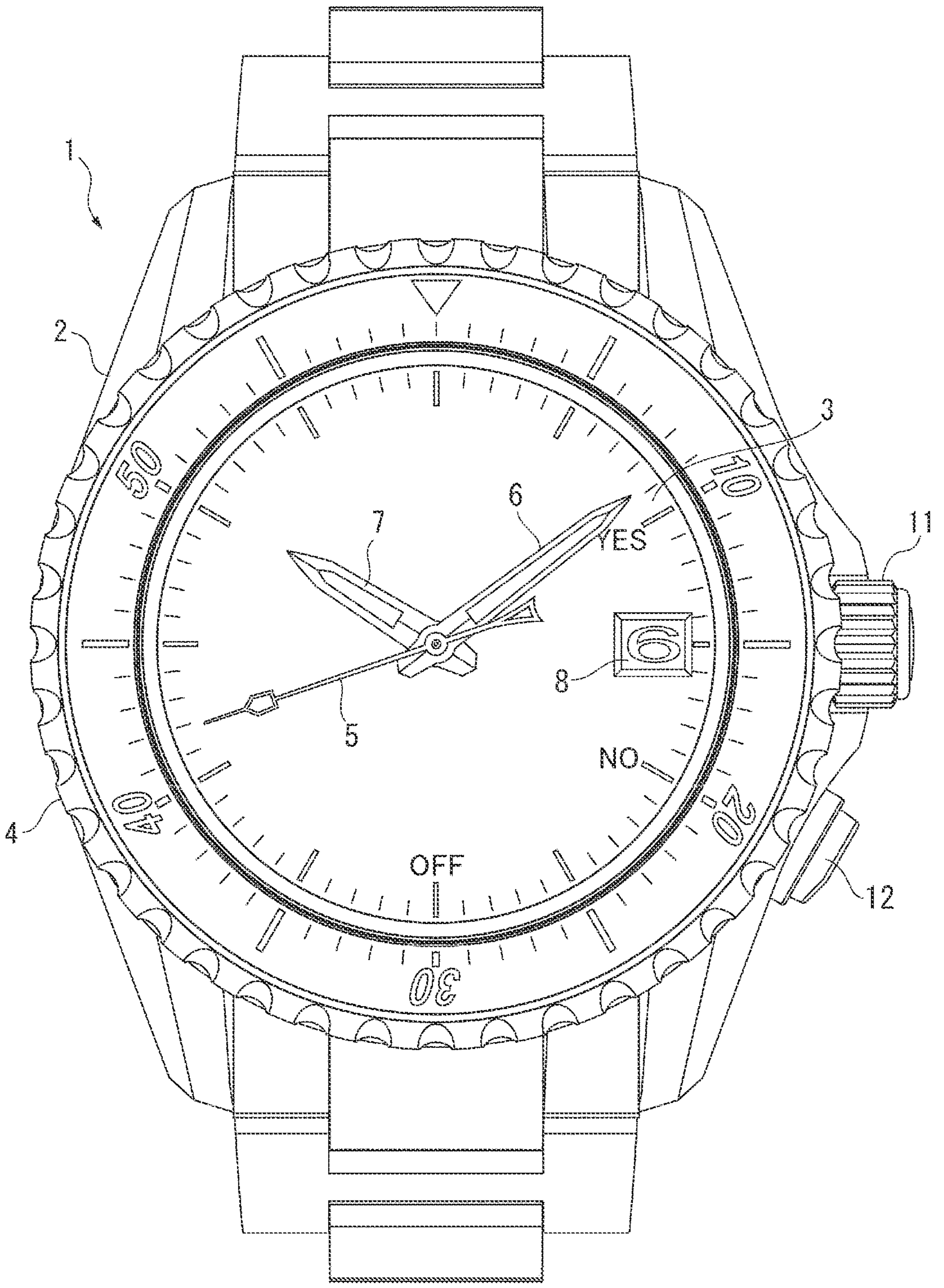
FIG. 1 is a front view illustrating an electronic watch.

As illustrated in FIG. 1, the electronic watch 1 is a diver watch which is worn on a user's wrist, and includes an outer case 2, a dial 3, a rotating bezel 4, a movement (not shown), a second hand 5, a minute hand 6, and an hour hand 7 which are hands, a date indicator 8, a crown 11, and a button 12.

The dial 3 is provided with a 60-divided scale. The character "YES" is written on the inner circumference side of the 10 second graduation scale, which is a first position indicated by the secondhand 5. The character "NO" is written on the inner circumference side of the 20 second graduation scale, which is a second position. The character "OFF" is written on the inner circumference side of the 30 second graduation scale, which is a third position. The rotating bezel 4 is also provided with a 60-divided scale.

Figure 2:
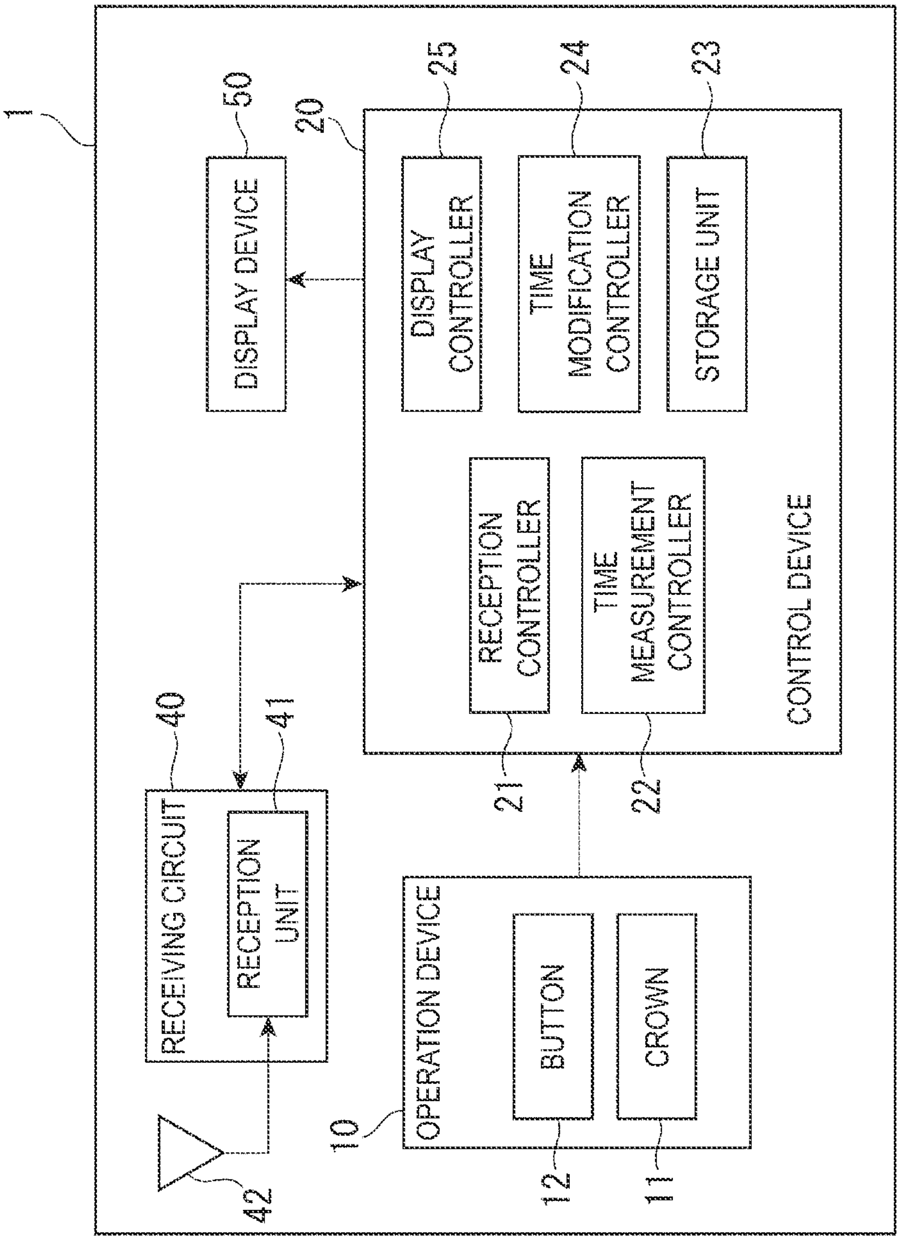
FIG. 2 is a block diagram illustrating a configuration of the electronic watch.

As illustrated in FIG. 2, the electronic watch 1 includes an operation device 10, a control device 20, a receiving circuit 40, and a display device 50.

The operation device 10 is configured of the crown 11 and the button 12. The crown 11 is movable to a zero-stage position, a one-stage position, and a two-stage position. The state in which the crown 11 is pushed most into the movement is the zero-stage position, and the one-stage position and the two-stage position are each in a state where the crown 11 is pulled to a different position. In the present exemplary embodiment, when the crown 11 is located at the zero-stage position, a time display mode for displaying time with a hand is performed.

The receiving circuit 40 includes a reception unit 41 that receives radio waves using an antenna 42. Note that in the present exemplary embodiment, the radio waves received by the antenna 42 are standard radio waves.

The display device 50 includes the second hand 5, the minute hand 6, the hour hand 7, the date indicator 8, and a wheel and a stepping motor for driving them. In the present exemplary embodiment, the display device 50 includes a second wheel and a second motor for driving the second hand 5, a time minute wheel and a time minute motor for driving the minute hand 6 and the hour hand 7, and a day wheel and a day motor for driving the date indicator 8.

As illustrated in FIG. 2, the control device 20 includes a reception controller 21, a time measurement controller 22, a storage unit 23, a time modification controller 24, and a display controller 25.

The reception controller 21 controls the receiving circuit 40 to perform radio wave reception processing.

The time measurement controller 22 includes a crystal oscillator, etc. and measures the internal time using a reference signal based on a oscillation signal of the crystal oscillator.

The storage unit 23 stores reception result data indicating whether radio wave reception is successful, reception time data acquired by radio wave reception, internal time data that is time-measured by time measurement controller 22, data indicating whether a reception permission state for permitting radio wave reception is set or a reception inhibition state for inhibiting radio wave reception is set, etc.

When receiving the radio waves and acquiring the reception time data, or when the time difference is modified manually, the time modification controller 24 modifies the internal time data stored in the storage unit 23.

The display controller 25 controls the display device 50 in accordance with the internal time data, and displays the internal time using the second hand 5, the minute hand 6, the hour hand 7, and the date indicator 8. In the reception result display mode, the reception result and the reception inhibition state are displayed using the second hand 5, which is one of a plurality of hands for displaying time.

In the present embodiment, the hands are not limited to only the secondhand 5, the minute hand 6, and the hour hand 7, and also include a disk-shaped member such as the date indicator 8 or a day wheel. Furthermore, the hands are not limited to displaying the time, and also may include a member such as a mode hand or an indicator hand which is driven by a stepping motor and indicates various types of information and conditions.

Reception Result Display Mode

Next, control by the control device 20 in a case where reception result display operation, which is first operation, is performed in the electronic watch 1 will be described using the flowchart of FIG. 3 and the operational illustration in FIG. 4.

In a state in which the crown 11 is at the zero-stage position, a time display mode for displaying time with a hand is performed. When the button 12 is pressed for a short time, for example, less than 3 seconds in this time display mode, the reception result display mode is performed. Accordingly, the first operation is operation of pushing the button 12 in a state where the crown 11 is at the zero-stage position.

Figure 3:
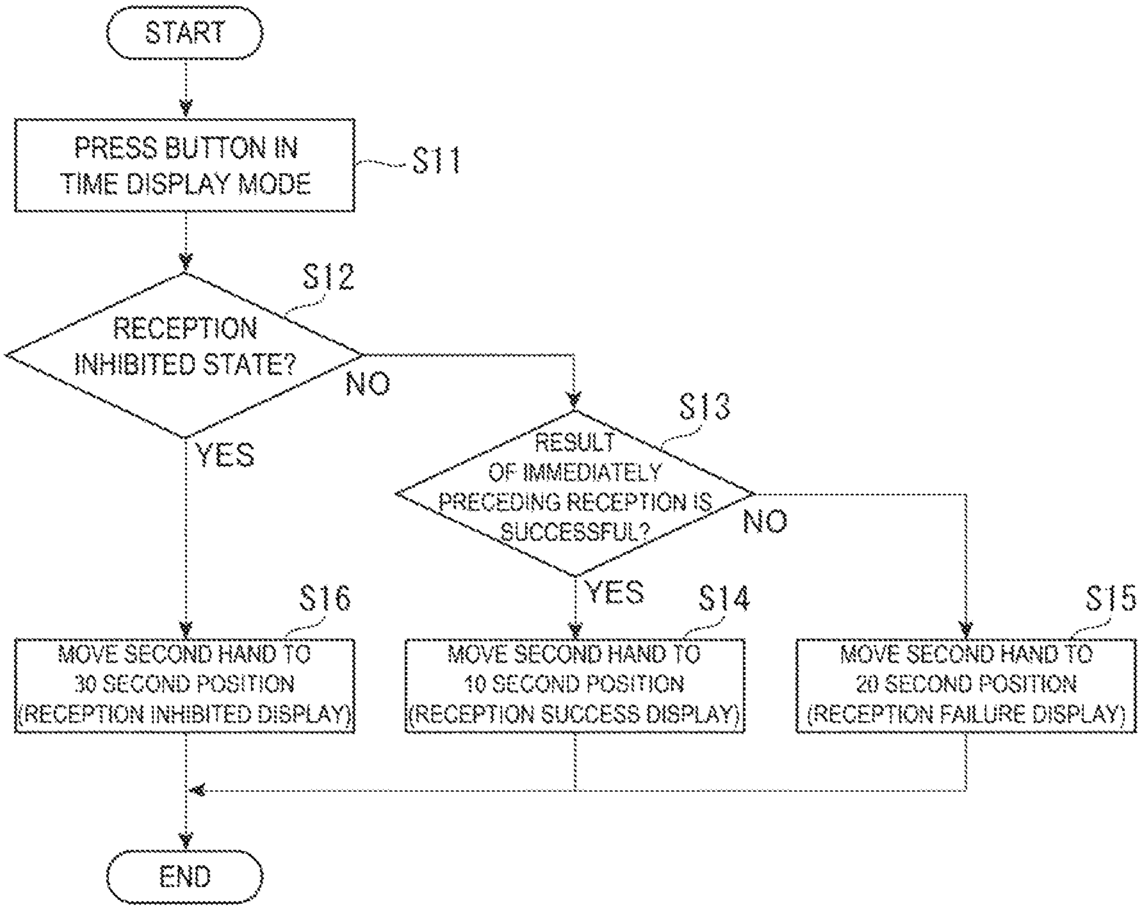
FIG. 3 is a flowchart illustrating control of a reception result display mode of the electronic watch.
Figure 4:
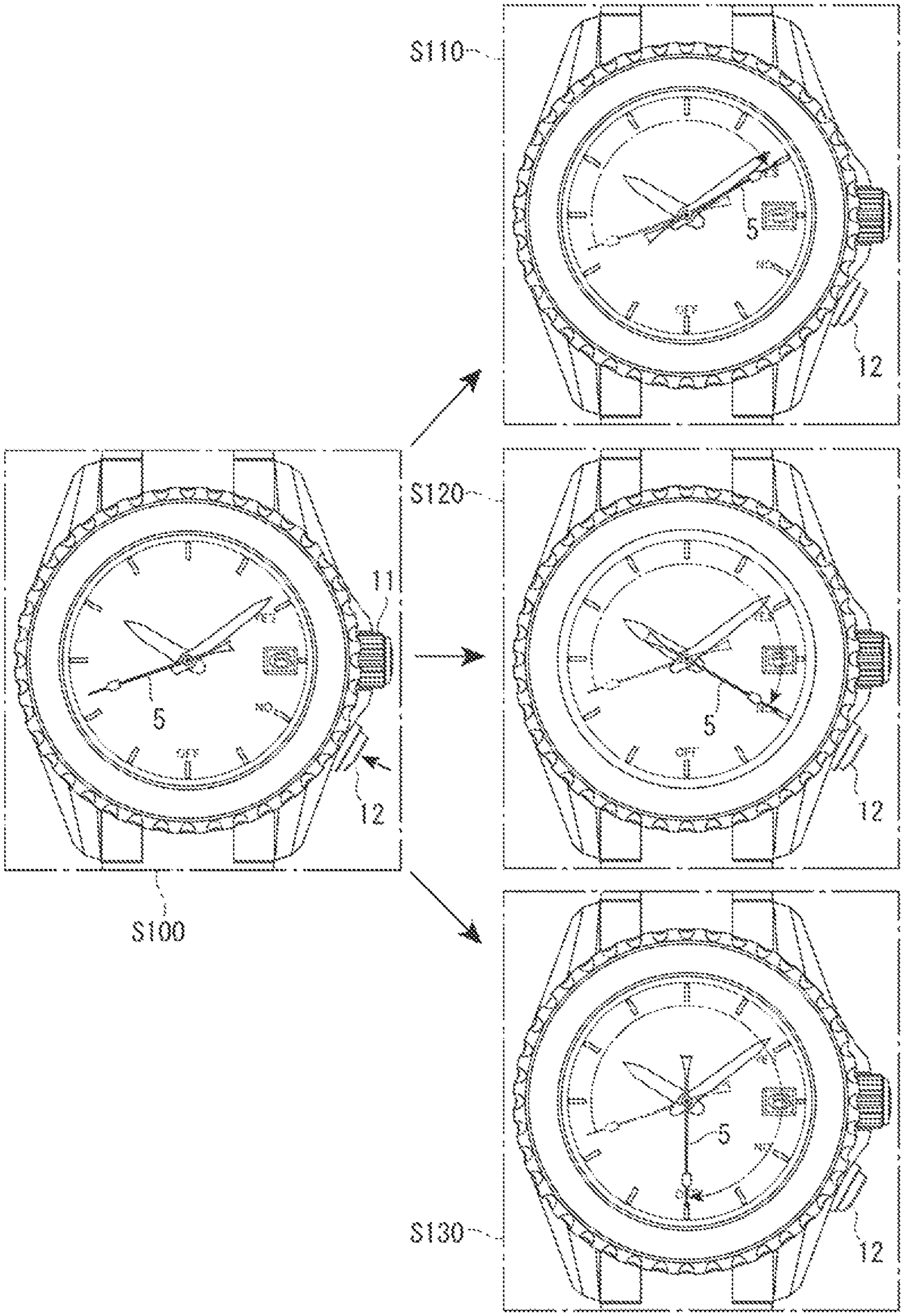
FIG. 4 is an operational illustration of the reception result display mode of the electronic watch.

As illustrated in FIG. 3, when the control device 20 executes step S11 in the time display mode to detect that the button 12 is pushed and released within 3 seconds to detect that the first operation is performed, the reception controller 21 executes step S12 to determine whether the reception inhibition state is set.

When the reception controller 21 determines NO in step S12, the reception controller 21 executes step S13 to determine whether the result of the immediately preceding reception is successful with reference to the reception result data of the storage unit 23.

When the reception controller 21 determines YES in step S13, the reception controller 21 executes step S14 in which the display controller 25 moves the second hand 5 to the "YES" position, which is the display of the reception success result, that is, a 10 second position, which is the first position. In other words, as illustrated in FIG. 4, the time display mode indicated by S100 shifts to the reception result display mode indicated by S110, and the secondhand 5 is forwarded clockwise from the current indicated position and stopped at 10 second position, that is, the YES position.

When the reception controller 21 determines NO in step S13, the reception controller 21 executes step S15 in which the display controller 25 moves the second hand 5 to the "NO" position, which is the display of the reception failure result, that is, a 20 second position, which is the second position. Then, as illustrated in S120 of FIG. 4, the second hand 5 is forwarded clockwise from the current indicated position and stopped at the 20 second position, that is, the NO position.

When the reception inhibition state is set and the reception controller 21 determines YES in step S12, the reception controller 21 executes step S16 in which the display controller 25 moves the second hand 5 to the "OFF" position, which is the display of the reception inhibition, that is, the 30 second position, which is the third position. Then, as illustrated in S130 of FIG. 4, the second hand 5 is forwarded clockwise from the current indicated position and stopped at the 30 second position, that is, the OFF position.

The reception result display mode is released when the manual operation is preformed, in particular, the button 12 is again pressed. This is also automatically released when 5 seconds have passed since the reception result display is started. Then, when the reception result display mode is released, the process returns to the time display mode. Thus, the display controller 25 fast-forwards the second hand 5 to a position indicating the current second that is time-measured by the time measurement controller 22, and then the secondhand 5 indicates the current second.

Automatic Reception Mode

Figure 5:
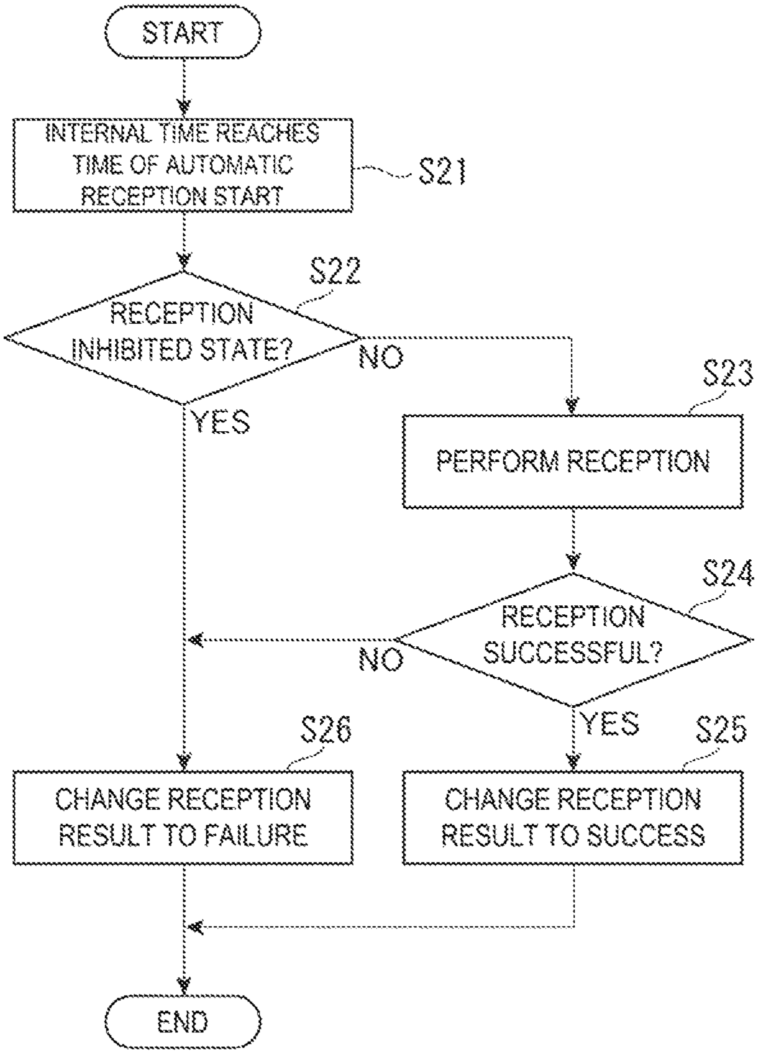
FIG. 5 is a flowchart illustrating control of an automatic reception mode of the electronic watch.

Next, control by the control device 20 when an automatic reception mode is performed in the electronic watch 1 will be described using the flowchart of FIG. 5.

When the internal time measured by the time measurement controller 22 reaches the time when the automatic reception starts and step S21 is executed, the reception controller 21 of the control device 20 executes step S22 for determining whether the reception inhibition state is set with reference to the storage unit 23. The reception inhibition state is a state in which reception is not performed even when the condition for initiating automatic reception and forced reception is satisfied. In other words, this state is a state in which radio wave reception is inhibited. Note that, in the electronic watch 1 that receives the standard radio waves, for example, the automatic reception start time is set at time such as 2:00 am, which has little effect on other radio waves. In addition, in the present exemplary embodiment, the automatic reception condition for executing the automatic reception processing is that the internal time reaches the automatic reception start time. However, as the automatic reception condition, for example, when the electronic watch 1 is provided with a solar cell, other conditions such as power generation by the solar cell may be set.

When the reception controller 21 determines NO in step S22, that is, when the reception inhibition state is not set and the reception permission state is set in which reception is permitted, the reception controller 21 executes step S23, and operates the receiving circuit 40 to perform the reception.

Next, the reception controller 21 executes step S24 to determine whether the reception is successful. When the reception controller 21 determines the reception is successful, that is, determines YES in step S24, the reception controller 21 executes step S25 to successfully change the reception result data of the storage unit 23.

On the other hand, when the reception controller 21 determines YES in step S22, that is, the reception inhibition state is set, and when the reception controller 21 determines NO in step S24, that is, the reception fails, the reception controller 21 executes step S26 to change the reception result data of the storage unit 23 to a failure.

Thus, when the automatic reception is performed in the reception permission state, the reception controller 21 updates the reception result data with the result of the executed automatic reception. When the automatic reception condition is satisfied in the reception inhibition state, the reception result data is set to the failure without performing the automatic reception.

Thus, when automatic reception is performed within the period of automatic reception, e.g., 2:00 am each day, in a case where the reception permission state is switched to the reception inhibition state and then switched to the reception permission state between 2:00 am and 2:00 am the next day, then the button 12 is pressed to display the most recent reception result when the reception result display mode is performed. For example, in a case where the most recent reception processing is the automatic reception, the result of the automatic reception is displayed, and in a case where the most recent reception processing is the forced reception, the result of the forced reception is displayed.

On the other hand, when the reception inhibition state is set over an automatic reception time, for example, in a case where automatic reception is performed at 2:00 am every day, the reception inhibition state is set before 2:00 am, and has passed 2:00 am with the reception inhibition state. When the state is switched to the reception permission state and the reception result display mode is performed, the second hand 5 indicates a reception failure, that is, the 20 second position when the reception result display mode is performed because the reception result data is set to a failure when the automatic reception time is reached in the reception inhibition state.

Forced Reception Mode

When the electronic watch 1 is in the time display mode and is in the reception permission state, the control device 20 performs a forced reception mode upon detecting that the button 12 has been depressed for 3 seconds or longer and less than 8 seconds. In the forced reception mode, the reception controller 21 controls the receiving circuit 40 to perform the reception process.

The reception controller 21 terminates the forced reception mode and returns to the time display mode in a case where the reception is successful, in a case where the reception is failed, and in a case where the button 12 is again pressed. The reception controller 21 stores the reception result data in the storage unit 23.

Reception ON/OFF Switching Mode

When the electronic watch 1 is in the time display mode, the control device 20 performs a reception ON/OFF switching mode in a case where the button 12 continues to be pressed for 8 seconds or longer. That is, the reception ON/OFF switching mode is performed in second operation in which the button 12 is pressed for 8 seconds or longer while the crown 11 is at the zero-stage position. Thus, in the present exemplary embodiment, the first operation and the second operation are common in that the crown 11 is at the zero-stage position, and differ in that the button 12 is pressed for less than 3 seconds and for 8 seconds or longer.

Then, when the user presses the button 12 for 8 seconds or longer in a case of the reception ON, that is, the reception permission state, the control device 20 switches to the reception OFF, that is, the reception inhibition state, and rewrites the data in the storage unit 23. Conversely, when the user presses the button 12 for 8 seconds or longer in a case of the reception OFF, that is, the reception inhibited state, the control device 20 switches to the reception ON, that is, the reception permission state, and rewrites the data in the storage unit 23. For example, when the electronic watch 1 is a diver watch, the user can switch the electronic watch 1 to the reception inhibition state prior to diving, thereby preventing the reception from starting during the dive and the hand for displaying the time from stopping.

Note that the processing for performing the reception ON/OFF switching mode includes two processes, which are described below depending on the setting of the control device 20.

The first setting is a configuration in which the reception ON/OFF switching is enabled, and when 3 seconds have passed since the operation of pressing the button 12 was started, the forced reception mode is not started even if the reception permission state is set at the time of operation of the button 12. In this case, the control device 20 does not start the forced reception mode even after 3 seconds have passed since the button 12 was pressed, and performs the reception ON/OFF switching mode when the button 12 is pressed and held for 8 seconds or longer.

The second setting is a configuration in which the reception ON/OFF switching is enabled, and when the reception permission state is set at the time of operation of the button 12, the forced reception mode is started when 3 seconds have passed from the start of the operation of pressing the button 12, and the reception ON/OFF switching mode is performed when the button 12 is pressed and held for 8 seconds or longer. In this case, the control device 20 starts the forced reception mode after 3 seconds have passed since the button 12 was pressed, and stops the forced reception mode and performs the reception ON/OFF switching mode when the button 12 is pressed and held for 8 seconds or longer.

After performing the switching operation of the reception permission state and the reception inhibition state, the control device 20 terminates the reception ON/OFF switching mode and returns to the time display mode in a case where the button 12 is pushed away or 5 seconds has passed.

Effect of the Present Exemplary Embodiment

The electronic watch 1 uses the second hand 5 as both a hand for displaying the reception result and a hand for displaying the reception inhibition state. When the first operation of the operation device 10 is performed, that is, the operation of pressing the button 12 is performed for less than 3 seconds in a case where the crown 11 is at the zero-stage position, either the reception result or the reception inhibition state can be displayed by the secondhand 5. Thus, in a case where the reception inhibition state is set, the second hand 5 indicates the 30 second position, which is the OFF position or the third position which is the reception inhibition state, and does not indicate the 10 second position, which is the first position, or the 20 second position, which is the second position for displaying the reception result. Therefore, it is possible to prevent the user of the electronic watch 1 from misunderstanding that the reception process is being performed even though the reception inhibition state is set.

The electronic watch 1 displays the reception result and the reception inhibition state by the second hand 5, which is one of the plurality of hands for displaying the time. Therefore, the number of the hands of the electronic watch can be reduced as compared with the case of displaying with a mode hand different from the hand for displaying the time. Therefore, the reception inhibition state and the reception result can be displayed by the general three-hand electronic watch 1.

The electronic watch 1 can display whether the reception result or the reception inhibition state while the crown 11 is at the zero-stage position. Therefore, there is no need to pull out the crown 11 in a case where a screw lock type crown 11 is used like a diver's watch, whereby the reception result and the reception inhibition state can be easily confirmed and the usability of the user can be improved.

By performing the second operation of the operation device 10, that is, the operation of pushing the button 12 for 8 seconds or longer at the zero-stage position by the crown 11, the user of the electronic watch 1 can optionally configure the reception permission state or the reception inhibition state. Therefore, convenience can be improved by switching the reception inhibition state on and off with simple operation.

In addition, since the second operation is performed when the crown 11 is at the zero-stage position, the reception permission state or the reception inhibition state can be easily switched even when the screw lock type crown is adopted. Therefore, the usability of the user can be further improved.

When the reception inhibition state continues for an extended period of time across the period of automatic reception, time modification by the reception is not performed, so that there is a possibility that the time accuracy decreases due to the oscillation variation of the crystal oscillator, and the display time may be shifted. Thus, when the reception inhibition state is released after the time shift occurs and the reception result display displays a success, which is the reception result prior to the reception being in the reception inhibition state, the user determines that the time shift has not occurred because the user has successfully received. However, in fact, the time shift occurs and is outside of the assurance range of time accuracy, so inconsistency occurs.

On the other hand, in the electronic watch 1 of the above-described exemplary embodiment, the reception result is set as a failure when the automatic reception condition is satisfied in the reception inhibition state. Thus, when the reception inhibition state is released, a failure is displayed in the reception result display, so that the inconsistency can be prevented.

The first operation and the second operation are distinguished by varying the time to press one button 12 with the crown 11 being positioned at the zero-stage. As a result, for example, it is not necessary to distinguish between operations by providing two or more buttons and to distinguish each operation, or to distinguish each operation by pressing the button 12 by changing the position of the crown 11. Therefore, the number of parts can be reduced and cost can be reduced, and operation can be improved because the operation of pulling the crown 11 to the one-stage position or the two-stage position is unnecessary. In addition, especially in diver watches, the structure is complicated because the pressure resistance of the button part is also required. However, the number of buttons can be reduced, and therefore, components for pressure resistance can be reduced, and the structure can be relatively simple.

Modification Example

The present disclosure is not limited to each of the above-described exemplary embodiments, and modifications, improvements, etc. within the scope in which the object of the present disclosure can be achieved are included in the present disclosure.

In the exemplary embodiment, the reception result and the reception inhibition state are displayed by the second hand 5, but may be displayed by the minute hand 6 and the hour hand 7. That is, the reception result and the reception inhibition state may be displayed by one of the second hand 5, the minute hand 6, and the hour hand 7, which are a plurality of hands for displaying the time. In addition, the reception result and the reception inhibition state may be displayed by the date indicator 8.

In addition, the reception result and the reception inhibition state may be displayed by a mode hand other than the hand for displaying the time. In this case, the time display can continue during display of the reception result and the reception inhibition state. Note that the mode hand may display other information such as the remaining battery level and the day of the week in the normal time display mode, and may display the reception result and the reception inhibition state when the first operation is performed.

In addition, the first position is designated as "YES", the second position is designated as "NO", and the third position is designated as "OFF" at the dial 3. However, it may be written at the rotating bezel 4, or may not be written at either the dial 3 or the rotating bezel 4. The first position is the 10 second position, the second position is the 20 second position, and the third position is the 30 second position, but the positions may be different.

The first operation and the second operation are not limited to the examples of the exemplary embodiments. For example, two buttons may be provided, and the first operation may be performed by pressing one button and the second operation may be performed by pressing the other button in a state where the crown 11 is at the zero-stage position. Alternatively, the first operation and the second operation may be performed by changing the position of the crown 11 and pressing the button 12.

In the above-described exemplary embodiment, the reception result display mode is performed in a case that the first operation is performed, but the reception result display mode may be performed not only when the first operation is performed, but also when the reception inhibition state is released and switched to the reception permission mode.

If the previous reception result is displayed when the reception inhibition state is released and the reception result display mode is performed, the user can confirm the assurance state of the time accuracy displayed by the electronic watch 1. That is, in a case where the success is displayed as the previous reception result when the reception inhibition state is released, it is possible to inform the user that the time accuracy displayed is guaranteed. In a case that the failure is displayed, the user can be informed that the time accuracy displayed is low. Thus, when a failure is displayed, the user can perform the forced reception operation to increase display time accuracy.

In the exemplary embodiment described above, the reception result data is set to a failure when the automatic reception condition is satisfied in the reception inhibition state. However, instead of setting it as a failure immediately, it may not be set as a failure within a certain period from the time of the previous successful reception, and may be set as a failure when a certain period or more, for example, one week or more has passed. That is, if the time period during which the reception is inhibited is a period in which time accuracy can be guaranteed without performing time modification by reception, the reception result data need not be changed to a failure. Therefore, if it is set to a failure when the time period to failure which time accuracy can be guaranteed is passed, the assurance state of time accuracy can be more accurately notified to the user.

The electronic watch 1 is not limited to a diver watch, and may be an electronic watch other than for divers.

Moreover, the radio waves received by the receiving circuit 40 are not limited to the standard radio waves, and may be satellite signals, short-range wireless signals, etc.

transmitted from a Global Positioning System (GPS) satellite. The reception unit 41 and the antenna 42 may be used depending on the type of radio waves to be received.

SUMMARY OF PRESENT DISCLOSURE

An electronic watch of the present disclosure includes a reception circuit configured to receive a radio wave, a hand, an operation device, a storage unit configured to store a reception result of whether reception by the reception circuit succeeds or fails, a display controller configured to control the hand, and a reception controller configured to switchably set a reception permission state where reception by the reception circuit is permitted and a reception inhibition state where reception by the reception circuit is inhibited, wherein when first operation of the operation device is performed, the hand indicates a first position in a case in which the reception permission state is set and a reception result stored in the storage unit is a success, indicates a second position in a case in which the reception permission state is set and a reception result stored in the storage unit is a failure, and indicates a third position in a case in which the reception inhibition state is set.

According to the electronic watch of the present disclosure, the hand for displaying the reception result and the hand for displaying the reception inhibition state are shared with the same hand, and when the first operation of the operation device is performed, either the reception result or the reception inhibition state is displayed by the hand, whereby when the reception inhibition state is set, the reception result is not displayed. Therefore, it is possible to prevent the user of the electronic watch from misunderstanding that the reception process is being performed even though the reception inhibition state is set. That is, when the first operation of the operation device is performed, the user can confirm both that it is set to the reception permission state and the result of the most recent reception processing in a case where the reception result is displayed by the hand, and the user can reliably confirm that the reception inhibition state is set in a case where the reception inhibition state is displayed, whereby misunderstanding does not occur.

In the electronic watch of the present disclosure, the hand is preferably one of a plurality of hands configured to display time.

According to the electronic watch of the present disclosure, the reception result and the reception inhibition state can be displayed by one of the plurality of hands for displaying the time, for example, the second hand. Therefore, the number of hands of the electronic watch can be reduced as compared with the case of displaying with a hand different from the hand for displaying the time.

In the electronic watch of the present disclosure, it is preferable that the operation device includes a crown and a button, and the first operation is to operate the button in a state where the crown is at a zero-stage position.

According to the electronic watch of the present disclosure, it is possible to display whether the reception result or the reception inhibition state in a state where the crown is at the zero-stage position. Therefore, there is no need to pull out the crown in a case where a screw lock type crown is used like a diver's watch, whereby the reception result and the reception inhibition state can be easily confirmed and the usability of the user can be improved.

In the electronic watch of the present disclosure, it is preferable that the reception controller is configured to, when second operation of the operation device is performed in a time display mode for displaying time with a plurality of hands, transition to a mode that enables switching of setting between the reception permission state and the reception inhibition state.

According to the electronic watch of the present disclosure, by performing the second operation, the user of the electronic watch can optionally set the reception permission state or the reception inhibition state, resulting in improved convenience.

In the electronic watch of the present disclosure, it is preferable that the operation device includes a crown and a button, the first operation is to press the button in a state where the crown is at a zero-stage position, the second operation is to press the button in a state where the crown is at a zero-stage position, and the first operation and the second operation differ in a pressing time of the button.

According to the electronic watch of the present disclosure, since the second operation is performed when the crown is at the zero-stage position, the reception permission state or the reception inhibition state can be easily switched even when the screw lock type crown is adopted. Therefore, the usability of the user can be improved.

In the electronic watch of the present disclosure, it is preferable that after the reception inhibition state is released, the hand indicates the first position or the second position in response to a reception result stored in the storage unit.

According to the electronic watch of the present disclosure, the previous reception result is displayed when the reception inhibition state is released, whereby the user can confirm the assurance state of the time accuracy displayed by the electronic watch. That is, in a case where the success is displayed as the previous reception result when the reception inhibition state is released, it can be notified that the time accuracy displayed is guaranteed. In a case that the failure is displayed, it can be notified that the time accuracy displayed is low. Thus, when a failure is displayed, the user can perform the forced reception operation.

In the electronic watch of the present disclosure, it is preferable that the reception controller is configured to perform reception by the reception circuit when the reception permission state is set and an automatic reception condition is satisfied, and store a failure as a reception result in the storage unit without performing reception by the reception circuit when the reception inhibition state is set and the automatic reception condition is satisfied.

When the reception inhibition state continues for an extended period of time across the period of automatic reception, time modification by the reception is not performed, so there is a possibility that the time accuracy decreases due to the oscillation variation of the crystal oscillator, and the display time may be shifted. Thus, when the reception inhibition state is released after the time shift occurs and the reception result display displays a success, which is the reception result prior to the reception being in the reception inhibition state, the user determines that the time shift has not occurred because the user has successfully received. However, in fact, the time shift occurs and is outside of the assurance range of time accuracy, so inconsistency occurs.

On the other hand, in the electronic watch of the present disclosure, the reception result is set as a failure when the automatic reception condition is satisfied in the reception inhibition state. Thus, when the reception inhibition state is released, a failure is displayed in the reception result display, so that the inconsistency can be prevented.

The control method for an electronic watch of the present disclosure is a control method for an electronic watch including a reception circuit configured to receive a radio wave, a hand, an operation device, and a storage unit configured to store a reception result of whether reception by the reception circuit succeeds or fails, the method including, when the first operation of the operation device is performed, indicating a first position by the hand in a case in which a reception permission state where reception by the reception circuit is permitted is set and a reception result stored in the storage unit is a success, indicating a second position by the hand in a case in which the reception permission state is set and a reception result stored in the storage unit is a failure, and indicating a third position by the hand in a case in which a reception inhibition state where reception by the reception circuit is inhibited is set, and switching between the reception permission state and the reception inhibition state when the second operation of the operation device is performed.

According to the control method for an electronic watch of the present disclosure, the hand for displaying the reception result and the hand for displaying the reception inhibition state are shared with the same hand, and when the first operation of the operation device is performed, either the reception result or the reception inhibition state is displayed by the hand, whereby when the reception inhibition state is set, the reception result is not displayed. Therefore, it is possible to prevent the user of the electronic watch from misunderstanding that the reception process is being performed even though the reception inhibition state is set.

In addition, by performing the second operation, the user of the electronic watch can optionally configure the reception permission state or the reception inhibition state, improving convenience.

What is claimed is:

1. An electronic watch comprising:
a reception circuit configured to receive a radio wave;
a hand;
an operation device;
a memory configured to store a reception result of whether reception by the reception circuit succeeds or fails;
a display controller configured to control the hand; and
a reception controller configured to switchably set a reception permission state where reception by the reception circuit is permitted and a reception inhibition state where reception by the reception circuit is inhibited, wherein
when a first operation is performed by operating the operation device,
the display controller controls the hand to:
indicate a first position in a case in which the reception permission state is set and the reception result stored in the memory is a success;
indicate a second position in a case in which the reception permission state is set and the reception result stored in the memory is a failure; and
indicate a third position in a case in which the reception inhibition state is set, and
the switching between the reception permission state and the reception inhibition state is performed by operating the operation device.

2. The electronic watch according to claim 1, wherein
the hand is one of a plurality of hands configured to display time.

3. The electronic watch according to claim 1, wherein
the operation device includes a crown and a button, and
the first operation is to operate the button in a state where the crown is at a zero-stage position.

4. The electronic watch according to claim 1, wherein
the reception controller is configured to, when a second operation is performed by operating the operation device in a time display mode for displaying time with a plurality of hands,
transition to a mode that enables the switching of setting between the reception permission state and the reception inhibition state.

5. The electronic watch according to claim 4, wherein
the operation device includes a crown and a button,
the first operation is to press the button in a state where the crown is at a zero-stage position,
the second operation is to press the button in the state where the crown is at the zero-stage position, and
the first operation and the second operation differ in a pressing time of the button.

6. The electronic watch according to claim 1, wherein
after the switching from the reception inhibition state to the reception permission state,
the display controller controls the hand to indicate the first position or the second position in response to the reception result stored in the memory.

7. The electronic watch according to claim 1, wherein
the reception controller is configured to:
perform reception by the reception circuit when the reception permission state is set and an automatic reception condition is satisfied; and
store a failure as the reception result in the memory without performing reception by the reception circuit when the reception inhibition state is set and the automatic reception condition is satisfied.

8. A control method for an electronic watch, the method comprising:
detecting that a first operation is performed by operating an operation device;
controlling, when the first operation is detected, a hand to:
indicate a first position in a case in which a reception permission state where reception by a reception circuit is permitted is set and a reception result stored in a memory is a success,
indicate a second position in a case in which the reception permission state is set and the reception result stored in the memory is a failure, and
indicate a third position in a case in which a reception inhibition state where reception by the reception circuit is inhibited is set;
detecting that a second operation is performed by operating the operation device; and
switching between the reception permission state and the reception inhibition state by operating the operation device when the second operation is detected.

* * * * *